H. LIGHTY.
Evaporating Pan.
No. 65,404.
Patented June 4, 1867.
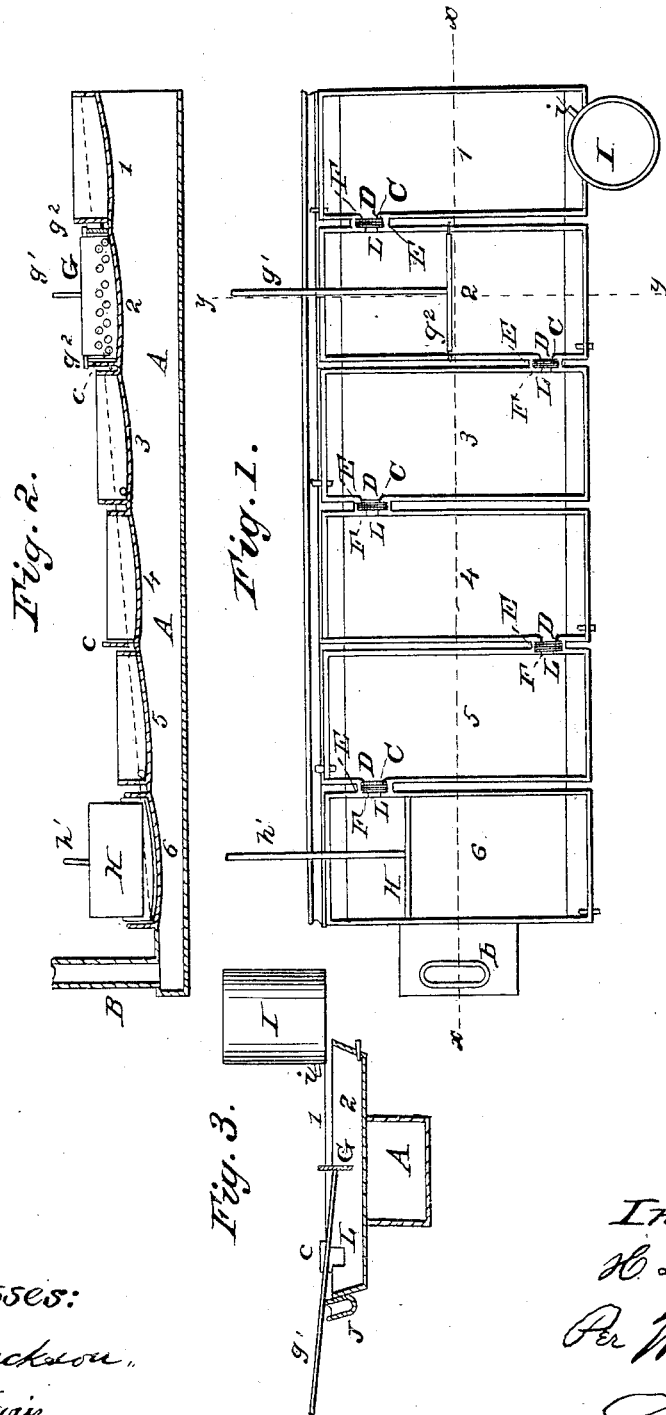

United States Patent Office.

HENRY LIGHTY, OF ATTICA, INDIANA.

Letters Patent No. 65,404, dated June 4, 1867.

---

IMPROVED EVAPORATOR.

---

The Schedule referred to in these Letters Patent and making part of the same.

---

TO ALL WHOM IT MAY CONCERN:

Be it known that I, HENRY LIGHTY, of Attica, in the county of Fountain, and State of Indiana, have invented a new and useful improvement in Evaporator; and I do hereby declare that the following is a full, clear, and exact description thereof, which will enable others skilled in the art to make and use the same, reference being had to the accompanying drawings, forming part of this specification, in which—

Figure 1 is a top or plan view of my improved evaporator.

Figure 2 is a vertical longitudinal section of the same, taken through the line $x\ x$, fig. 1.

Figure 3 is a vertical cross-section of the same, taken through the line $y\ y$, fig. 1.

Similar letters of reference indicate like parts.

My invention has for its object to furnish an improved evaporator so constructed and arranged as to greatly diminish the labor attending the evaporation of the juice, and at the same time to separate the scum and sediment from the sirup, and to guard against scorching or burning; and it consists in the combination of a recess and sliding-gate with each other and with the edges of the adjacent pans, when said pans are constructed and arranged as hereinafter more fully described.

A is the furnace, the fire-chamber of which extends back, gradually decreasing in size, to the flue B. The bottoms of the pans 1, 2, 3, 4, 5, 6, form the top of the fire-chamber. These pans are made separate, and their sides are at a little distance from each other, as shown in figs. 1 and 2. They are set across the furnace, as shown, and each succeeding pan, from the front towards the rear, is set a little lower than the preceding one. The drawings represent the pans as being solidly attached to the furnace, but this is not essential, and I generally prefer to make them detachable, so that they can be removed when necessary. In the rear side of each pan, near one of its ends, is formed a vertical slot, D, extending from the upper edge of said side to near its bottom. This slot is covered with a sliding-gate, C. Around the slot D, on the outer side of the pan, is formed a recess, E, which opens into the adjacent pan through a notch, L, formed in its side. Within some or all of the recesses E are placed strainers, F, as shown in the drawings. The slots D are formed alternately near the opposite ends of the pans, so that the juice must necessarily flow diagonally across the said pans. The ends of the pans are made inclined or flaring, as shown in figs. 1 and 3, for convenience in skimming. The skimmer G is made of a perforated plate of a length equal to the breadth of the pans, and of a breadth somewhat less than the depth of said pans. To the forward side of the skimmer G is attached a long handle, $g^1$, by means of which the skimmer is operated, and from its upper end edges project short arms, $g^2$, which slide upon the upper edges of the pans and prevent the skimmer from sinking so deep into said pans as to disturb the sediment in their bottoms. H is the scraper, which is formed of a plate of sheet metal bent over upon itself at the middle, and enclosing between its ends a strip of buck-skin, or other equivalent substance, as shown in fig. 2. This scraper H is of a length equal to the breadth of the pans, and has a long handle, $h'$, attached to its forward side, by means of which it is operated. I is a reservoir attached to or placed above the evaporator in such a position that the juice may be drawn directly from it into the pan 1. For effecting this conveniently a stop-cock, $i'$, is placed in the said reservoir, as shown in figs. 1 and 3. In using the apparatus, the slide-gate between pans 3 and 4 is closed, and the pans 4 5 6 filled with water. The juice from the reservoir I is then allowed to flow into the pan 1, and the fire is started. As the juice begins to thicken the water is drawn off from the pan 4 and the sirup admitted, and so on with the pans 5 and 6. As the scum begins to form, it is drawn off with the skimmer G, drawn up the inclined end of the pan, and allowed to fall into the trough J, which carries it away. The sirup flows from one pan to the next one by flowing into the recess E beneath the slide-gate C, and rising through said recess, through the strainer F, flows into the next pan. The gates C keeping the scum from flowing from one pan to another, the sirup rising through the recesses E prevents the sediment from flowing with it from one pan to another, and the strainers F prevent the passage of substances too heavy to float with the scum and too light to sink with the sediment, the sirup thus passing pure from one pan to another. When the sirup reaches the pan 6, if sufficiently thick, it is allowed to flow into a receiver through the orifice in the end of the pan. If too thin, when the said pan 6 becomes almost full, the gate C, between the pans 5 6, is closed, and the sirup boiled till finished. The orifices in the end of the pan 6 are then opened, and the scraper H inserted in the end of the pan nearest to the recess E, and the sirup pushed before it towards the other end of the pan. As soon as the scraper H has passed the recess E the gate C is raised, and the sirup from the pan 5 flows into the pan 6 and follows the scraper H as it moves along, thus preventing the bottom of said pan from becoming scorched.

I claim as new, and desire to secure by Letters Patent—

The skimmer G, when constructed and operated substantially as herein described and for the purpose set forth.

HENRY LIGHTY.

Witnesses:
 W. W. ENNIS,
 T. M. POWELL.